United States Patent Office 3,238,194
Patented Mar. 1, 1966

3,238,194
OPTIONALLY N-SUBSTITUTED 17-OXYGENATED-2-AMINO-5α-ANDROSTAN-3-OLS
Paul D. Klimstra, Northbrook, and Raymond E. Counsell, Skokie, Ill., assignors to G. D. Searle & Co., Chicago, Ill., a corporation of Delaware
No Drawing. Filed Dec. 12, 1962, Ser. No. 243,993
12 Claims. (Cl. 260—239.5)

The present invention is concerned with novel steroids possessing a nitrogen-containing substituent at the 2-position and, more particularly, with optionally N-substituted 17-oxygenated-2-amino-5α-androstan-3-ols of the structural formula

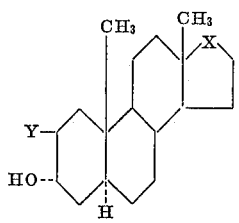

wherein X represents a carbonyl, β-hydroxymethylene, or α-(lower alkyl)-β-hydroxymethylene radical, and Y symbolizes an amino radical or the residue of an amine selected from the group consisting of di-(lower alkyl), di-[hydroxy(lower alkyl)], cycloaliphatic, and heterocycloaliphatic amines.

Examples of the lower alkyl radicals indicated in the above representation are methyl, ethyl, propyl, butyl, pentyl, hexyl, and the branched-chain isomers thereof. The cycloaliphatic amino groups are typified by pyrrolidino and piperidino and the heterocyloaliphtic amino radicals by morpholino and 4-alkylpiperazino.

The compounds of the present invention are conveniently manufactured by utilizing as starting materials the appropriately substituted 2α,3α-epoxides, represented by the structural formula

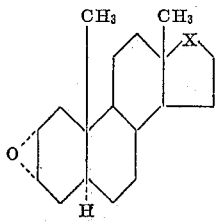

wherein X is indicative of a carbonyl, β-hydroxymethylene, or α-(lower alkyl)-β-hydroxymethylene radical. The reaction of a representative epoxide with ammonia or the appropriate amine results in the corresponding 2β-amino-3α-ol. As a specific example, 2α,3α-epoxy-5α-androstan-17-one is heated with piperidine in ethylene glycol solution to produce 3α-hydroxy-2β-piperidino-5α-androstan-17-one.

An alternate process for the manufacture of the instant 17β-hydroxy compounds involves reaction of the corresponding 17-keto substances with a suitable reducing agent. Catalytic hydrogenation of the aforementioned 3α-hydroxy-2β-piperidino-5α-androstan-17-one, for example, in the presence of a hydrogenation catalyst such as platinum oxide results in 2β-piperidino-5α-androstane-3α,17β-diol.

A process particularly useful for the manufacture of the N-unsubstituted amino compounds of this invention consists of allowing a 2α,3α-epoxy starting material to react with sodium azide to yield the 2β-triazo-3α-ol, followed by catalytic reduction of the latter intermediate, resulting in the corresponding 2β-amino-3α-ol. This process is specifically illustrated by the reaction of 2α,3α-epoxy-5α-androstan-17-one with sodium azide in aqueous dioxane to yield 3α-hydroxy-2β-triazo-5α-androstan-17-one, followed by catalytic hydrogenation in the presence of platinum oxide catalyst to afford 2β-amino-5α-androstane-3α,17β-diol. The instant 2β-amino-3α-hydroxy-5α-androstan-17-one is obtained by submitting 2α,3α-epoxy-5α-androstan-17-one 17-ethylene ketal to the latter reaction with sodium azide, reducing the triazo group catalytically, then removing the ketal function by heating with acetic acid in aqueous methanol. The latter 2β-amino-17-one is produced also by the reaction of 2α,3α-epoxy-5α-androstan-17-one with ammonia in ethylene glycol solution at elevated temperature followed by reaction with concentrated hydrochloric acid in methanol.

The optionally N-substituted 2β-amino compounds of the present invention exhibit valuable pharmacological properties. They, are, for example, androgenic and hypocholesterolemic agents. In addition, they inhibit pepsin activity and are antibiotic in view of their ability to inhibit the growth of such organisms as *Chlorella vulgaris* and *Diplococcus pneumoniae*. The usefulness of the instant 2β-triazo compounds as intermediates in the manufacture of the N-unsubstituted 2β-amino compounds is apparent from this specification.

The invention will appear more fully from the examples which follow. These examples are set forth by way of illustration only, and it will be understood that the invention is not to be construed as limited either in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 2 parts of 2α,3α-epoxy-5α-androstan-17-one in 20 parts of dioxane is added a solution of 0.7 part of sodium azide in 3 parts of water, and the resulting reaction mixture is heated at the reflux temperature for about 24 hours, then is poured into a mixture of ice and water. After stirring for about 30 minutes, the precipitated solid is collected by filtration, washed on the filter with water, and dried. Recrystallization from a mixture of hexane and acetone results in pure 3α-hydroxy-2β-triazo-5α-androstan-17-one, melting at about 164–165.5°. It is further characterized by an optical rotation of +103° in chloroform, and also by the structural formula

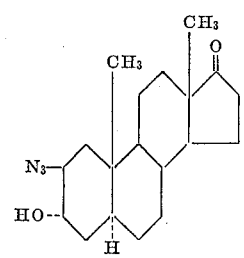

Example 2

A mixture of 5 parts of 2α,3α-epoxy-17α-methyl-5α-androstan-17β-ol, 6 parts of sodium azide, 40 parts of water, and 90 parts of dioxane is heated at the reflux temperature with stirring for about 20 hours. At the end of this time an additional quantity of 6 parts of sodium azide dissolved in 40 parts of water containing 90 parts of dioxane is added, and heating at the reflux temperature is continued for about 24 hours longer. The reaction mixture is then cooled and poured into a mixture of ice and water. The precipitate which results is collected by filtration, washed with water, and dried, then is recrystallized from aqueous methanol to afford 17α-methyl-2β-triazo-5α-androstane-3α,17β-diol, melting at about 170° and characterized also by infrared absorption maxima at about 2.74 and 4.72 microns. It is represented by the structural formula

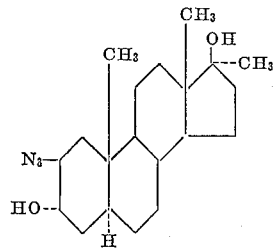

*Example 3*

To a solution of 2 parts of 3α-hydroxy-2β-triazo-5α-androstan-17-one in 60 parts of ethanol is added 0.1 part of platinum oxide catalyst, and the resulting reaction mixture is shaken with hydrogen at room temperature and 3 atmospheres pressure until the uptake of hydrogen ceases. The catalyst is removed by filtration, and the filtrate is evaporated to dryness at reduced pressure. The residual solid is recrystallized from methanol and washed on the filter with tetrahydrofuran to afford 2β-amino-5α-androstane-3α,17β-diol, melting at about 239–242°. It displays infrared absorption maxima at about 2.94 and 3.0 microns and is represented by the structural formula

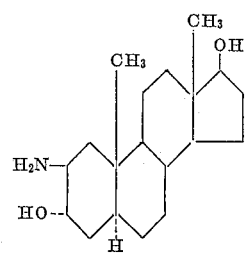

*Example 4*

By substituting 2.1 parts of 17α-methyl-2β-triazo-5α-androstane-3α,17β-diol and otherwise proceeding according to the procedure described in Example 3, 2β-amino-17α-methyl-5α-androstane-3α,17β-diol of the structural formula

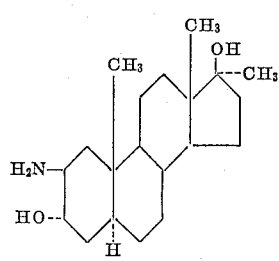

is obtained.

*Example 5*

A mixture of 4 parts of 2α,3α-epoxy-5α-androstan-17-one, 17.2 parts of piperidine, and 89 parts of ethylene glycol is heated at the reflux temperature for about 18 hours, then is poured into a mixture of ice and water. The precipitated solid is collected by filtration, washed on the filter with water, and dried, then is recrystallized from aqueous methanol to afford pure 3α-hydroxy-2β-piperidino-5α-androstan-17-one, melting at about 220–223° with decomposition. It is represented by the structural formula

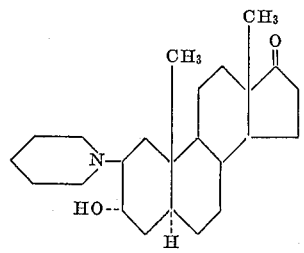

*Example 6*

The substitution of 2.26 parts of 3α-hydroxy-2β-piperidino-5α-androstan-17-one in the procedure described in Example 4 results in 2β-piperidino-5α-androstane-3α,17β-diol of the structural formula

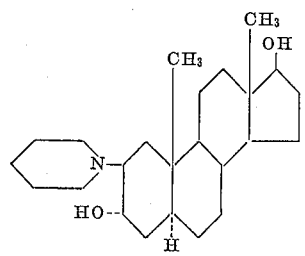

*Example 7*

A mixture of 4 parts of 2α,3α-epoxy-5α-androstan-17-one, 6 parts of dimethylamine, and 111 parts of ethylene glycol is heated at about 153° in a sealed container for about 20 hours. The reaction mixture is then cooled and poured into about 300 parts of a mixture of ice and water. The precipitate which forms is collected by filtration, washed on the filter with water, and dried. This solid material is extracted with ether, and the ether extract is dried over anhydrous potassium carbonate containing decolorizing carbon. Distillation of the solvent affords 3α-hydroxy-2β-dimethylamino-5α-androstan-17-one as an oil. It is characterized by infrared absorption maxima at about 2.75, 3.4, and 5.75 microns and also by the structural formula

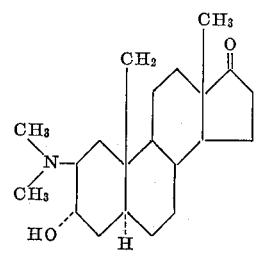

*Example 8*

The substitution of 9.73 parts of diethylamine in the process described in Example 7 results in 2β-diethylamino-3α-hydroxy-5α-androstan-17-one of the structural formula

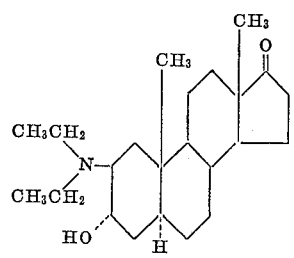

Example 9

A mixture of 5 parts of 2α,3α-epoxy-5α-androstan-17-one, 22.5 parts of N-methylpiperazine, and 111 parts of ethylene glycol is heated at the reflux temperature for about 18 hours, then is cooled and poured into a mixture of ice and water. The resulting precipitate is collected by filtration, then is dissolved in a mixture of ether and methanol. This organic solution is washed with water, then is dried over anhydrous potassium carbonate containing decolorizing carbon. To this dried solution is added excess isopropanolic hydrogen chloride, and the resulting precipitated salt is collected by filtration and dried to yield 3α-hydroxy-2β-(4-methylpiperazino)-5α-androstan-17-one hydrochloride, characterized by an optical rotation of +82.5° in methanol.

The latter hydrochloride salt is dissolved in water, and the resulting aqueous solution is filtered, then is treated with 10% aqueous sodium carbonate. The precipitate which forms is collected by filtration, washed with water, and dried, then is recrystallized from aqueous methanol to afford pure 3α-hydroxy-2β-(4-methylpiperazino)-5α-androstan-17-one, melting at about 151–153°. This substance is characterized further by an optical rotation of +134.5° in chloroform and also by the structural formula

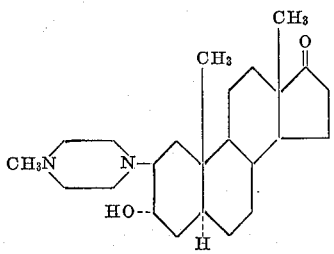

Example 10

A solution containing 5 parts of 2α,3α-epoxy-17α-methyl-5α-androstan-17β-ol, 22.5 parts of N-methylpiperazine, and 111 parts of ethylene glycol is heated at the reflux temperature for about 18 hours, then is poured into about 2000 parts of water. The resulting precipitate is collected by filtration, washed on the filter with water, dried, and extracted with ether. This organic solution is washed with water, dried over anhydrous potassium carbonate containing decolorizing carbon, and stripped of solvent at reduced pressure to afford a semi-solid residue. This semi-solid is dissolved in a mixture of hexane and acetone, and is treated with isopropanolic hydrogen chloride to afford 17α-methyl-2β-(4-methylpiperazino)-5α-androstane-3α,17β-diol hydrochloride.

To a solution of this hydrochloride in aqueous methanol is added excess 10% aqueous sodium carbonate, and the resulting precipitate is collected by filtration, washed on the filter with water, and dried. Recrystallization from aqueous methanol produces pure 17α-methyl-2β-(4-methylpiperazino)-5α-androstane-3α,17β-diol, represented by the structural formula

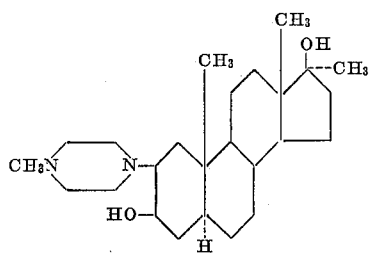

Example 11

The reaction of 5.23 parts of 2α,3α-epoxy-17α-ethyl-5α-androstan-17β-ol with 25.7 parts of N-ethylpiperazine according to the procedure of Example 10 affords 17α-ethyl-2β-(4-ethylpiperazino)-5α-androstane-3α,17β-diol of the structural formula

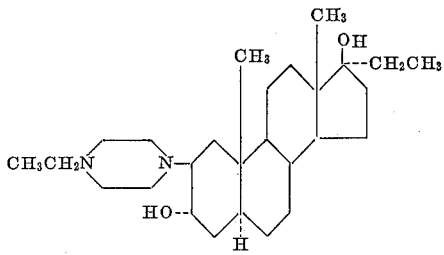

Example 12

A solution of 5 parts of 2α,3α-epoxy-5α-androstan-17-one, 27.5 parts of di-(2-hydroxyethyl)amine, and 111 parts of ethylene glycol is heated at the reflux temperature for about 18 hours, then is poured into water. The precipitate which forms is collected by filtration, then is recrystallized from aqueous methanol to afford pure 3α-hydroxy-2β-[di-(2-hydroxyethyl)amino]-5α-androstan-17-one, which substance melts at about 213–216°. It displays an optical rotation of +15° in chloroform and is further characterized by the structural formula

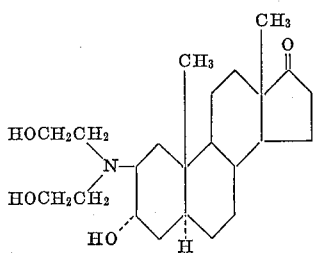

Example 13

By substituting 34.8 parts of di-(3-hydroxypropyl)amino and otherwise proceeding according to the processes described in Example 12, 3α-hydroxy-2β-[di-(3-hydroxypropyl)amino]-5α-androstan-17-one is obtained. This substance is represented by the structural formula

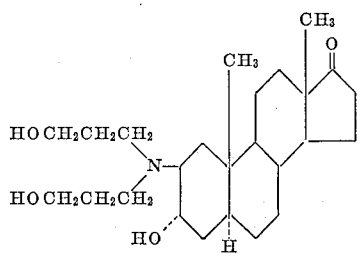

Example 14

A solution of 5 parts of 2α,3α-epoxy-5α-androstan-17-one and 25 parts of morpholine in 111 parts of ethylene glycol is heated at the reflux temperature for about 18 hours, then is poured into a mixture of ice and water. The resulting gummy mixture is extracted with ether, and the ether solution is separated, washed with water, and dried over anhydrous potassium carbonate containing decolorizing carbon. Distillation of the solvent at reduced pressure affords a semi-solid residue which is dissolved in ether and treated with isopropanolic hydrogen chloride. The resulting precipitate is collected by filtration, washed with ether, dried, and dissolved in aqueous acetone. Excess 4 N aqueous sodium hydroxide is added, and the resulting precipitate is collected by filtration and dried to afford 3α-hydroxy-2β-morpholino-5α-androstan-17-one. To a solution of this material in ether is added isopropanolic hydrogen chloride, and the resulting precipitate is collected by filtration, then recrystallized from a mixture of methanol and ethyl acetate to yield 3α-hydroxy-2β-morpholino-5α-androstan-17-one hydrochloride, melting at about 220–225° with decomposition. It is represented by the structural formula

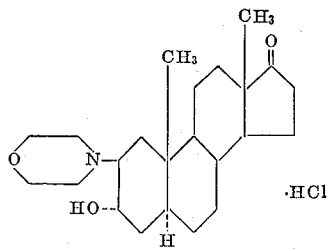

*Example 15*

By substituting 2.3 parts of 2α,3α-epoxy-5α-androstan-17-one 17-ethylene ketal and otherwise proceeding according to the processes described in Example 1, 3α-hydroxy-2β-triazo-5α-androstan-17-one 17-ethylene ketal is obtained.

A mixture of 2 parts of 3α-hydroxy-2β-triazo-5α-androstan-17-one 17-ethylene ketal, 60 parts of ethanol, and 0.1 part of platinum oxide catalyst is catalytically hydrogenated according to the procedure of Example 3 to yield 2β-amino-3α-hydroxy-5α-androstan-17-one 17-ethylene ketal.

To a solution of 5 parts of 2β-amino-3α-hydroxy-5α-androstan-17-one 17-ethylene ketal in 160 parts of methanol is added a solution of 5.25 parts of acetic acid in 15 parts of water, and the resulting mixture is heated on a steam bath for about 10 minutes, then is poured into a mixture of ice and water. This aqueous mixture is made alkaline by the addition of 10% aqueous sodium carbonate, then is extracted with ether, and the ether solution is separated, washed with 5% aqueous sodium bicarbonate, dried over anhydrous potassium carbonate containing decolorizing carbon, and stripped of solvent at reduced pressure to afford 2β-amino-3α-hydroxy-5α-androstan-17-one. This substance is characterized by infrared maxima at 2.75, 3.4, and 5.75 microns, and also by the structural formula

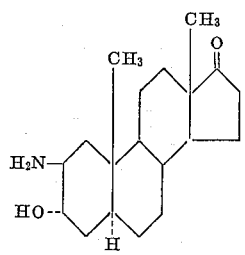

What is claimed is:
1. A compound of the structural formula

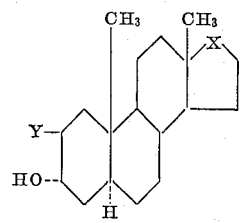

wherein X is a member of the class of radicals consisting of carbonyl, β-hydroxymethylene, and α-(lower alkyl)-β-hydroxymethylene and Y is selected from the group of radicals consisting of amino, di-(lower alkyl)amino, di-[hydroxy(lower alkyl)amino] and

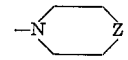

wherein Z is a member of the class of radicals consisting of epoxy, methylene, and (lower alkyl)amino.
2. 2β-amino-5α-androstane-3α,17β-diol.
3. 3α-hydroxy-2β-piperidino-5α-androstan-17-one.
4. 3α-hydroxy-2β-(4-methylpiperazino)-5α-androstan-17-one.
5. 3α-hydroxy-2β-[di-(2-hydroxyethyl)amino]-5α-androstan-17-one.
6. 3α-hydroxy-2β-morpholino-5α-androstan-17-one.
7. 17α-methyl-2β-(4-methylpiperazino)-5α-androstane-3α,17β-diol.
8. A compound of the structural formula

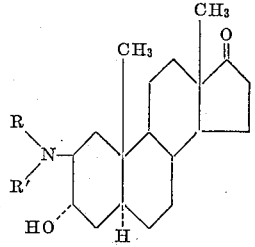

wherein R and R' are radicals of the formula $$C_nH_{2n+1}$$

*n* being a positive integer less than 7.
9. 3α-hydroxy-2β-dimethylamino-5α-androstan-17-one.
10. 3α-hydroxy-2β-triazo-5α-androstan-17-one.
11. 17α-methyl-2β-triazo-5α-androstane-3α,17β-diol.
12. A compound of the formula

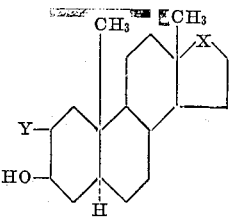

wherein X is selected from the group consisting of carbonyl, and β-hydroxymethylene, and Y is selected from the group consisting of amino, di-(lower alkyl)amino, di-(2-hydroxyethyl)amino, morpholino and piperidino.

No reference cited.

LEWIS GOTTS, *Primary Examiner.*